April 14, 1942.  P. J. DYE  2,279,563
WRAP MEASURING APPARATUS
Filed Jan. 10, 1941
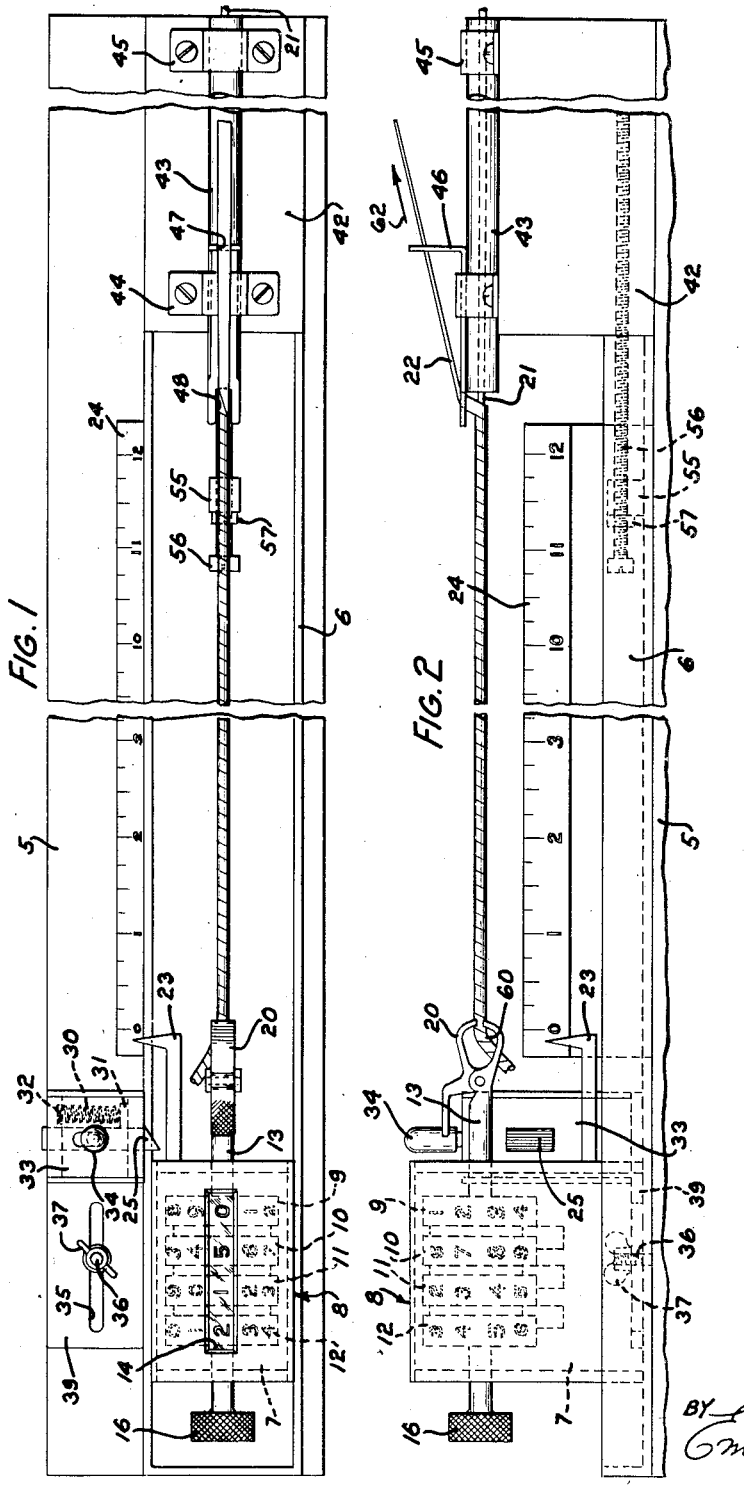
INVENTOR
P. J. DYE
BY Emery Robinson
ATTORNEY Patented Apr. 14, 1942

2,279,563

UNITED STATES PATENT OFFICE 2,279,563

WRAP MEASURING APPARATUS

Paul J. Dye, Lyndhurst, N. J., assignor to Western Electric Company, Incorporated, New York, N. Y., a corporation of New York Application January 10, 1941, Serial No. 373,948

13 Claims. (Cl. 73—51)

This invention relates to wrap measuring apparatus and more particularly to apparatus for counting the turns per foot of servings on strands.

It is an object of the present invention to provide a simple and efficient wrap measuring apparatus.

In accordance with one embodiment of the invention, an apparatus is provided for counting the number of turns or wraps of insulation on a predetermined length of wire and comprises a counter mounted upon a slidable block, which is slidable on a track having a scale fixed to it for cooperation with the counter to indicate the length of wire from which servings have been removed. The counter driving shaft is provided with a clamp for gripping one end of a wire, the other end of which has been inserted in a tube, thereby to provide means to hold the two ends of the wire during the rotation thereof by an operator withdrawing the serving of insulation from the wire, and the wire, as it rotates during the withdrawal of the servings from it, will drive the counter as the serving unwraps itself from the wire and the wire advances into the tube. Thus, the number of rotations of the wire in unwrapping a serving from it will be counted. The distance which the counter travels may be determined by the stationary scale. Thus, the amount of movement of the counting apparatus along the track and the number of turns of the wire may be readily determined by consulting the counter and the stationary scale to determine the number of rotations of the wire and the distance the counter travels.

A better understanding of the invention will be had by reference to the accompanying drawing, wherein—

Fig. 1 is a plan view of the apparatus embodying the invention, parts being broken away to conserve space and Fig. 2 is a side elevational view of the apparatus shown in Fig. 1.

Referring to the drawing, wherein like reference characters designate the same parts throughout the several views, and wherein there is shown a base member 5 for supporting the entire unit, the base member has a trackway 6 positioned on it, in which there is slidable a counter supporting block 7. The counter supporting block, in turn, supports the counter mechanism 8, which counts the turns of insulation per foot of wire in the apparatus. This counter may be of any suitable construction, which includes a series of four counter wheels 9, 10, 11 and 12, driven by a shaft 13, wherein the wheel 9 represents tenths, the wheel 10 represents units, the wheel 11 represents tens, and the wheel 12 represents hundreds denominations, respectively. Suitable carry mechanism (not shown) is provided in the counter mechanism 8 for stepping the next higher denomination wheel ahead each time the next lower denomination wheel moves through one complete cycle and the counter wheels are each graduated in ten parts so that when the shaft 13 rotates through one complete turn, the counter wheel 9 will also rotate through one complete turn and if the shaft 13 rotates through a fraction of a turn, the position of the counter wheel 9 will indicate that portion of a rotation in tenths of a turn, suitable markings being placed on each of the counter wheels, the numbers running from zero through nine on each wheel, and these markings being readable through a window 14 at the top of the counter 8. In this manner, as the shaft 13 is rotated, the counter wheels will indicate tenths of a rotation and the number of rotations up to 999.9 revolutions. As is usual in counters of this type, there is provided a thumb nut 16 which may be rotated to lock the counter against movement and this mechanism is provided for locking the counter during the unsnarling of any tangles which may form in the wire, the wrappings on which are being measured.

Fixed to the end of the shaft 13 is a spring pressed clamp 20, which is adapted to receive and grip the end of a length of wire from which insulation is to be unwrapped. The wire is indicated at 21 and has a wrapping 22 of insulation around it.

Extending outwardly from the counter supporting block 7 is a pointer 23 adapted to cooperate with a scale 24, which is located adjacent the trackway 6 and is graduated in inches and fractions of an inch. The pointer 23 cooperates with the scale 24 to indicate the distance the counter block is moved in unwrapping the wrapping 22 of insulation from the wire 21 and a stop latch 25 normally extends into the path of counter supporting block 7 to prevent movement of the block to the right (Figs. 1 and 2). The latch 25 is normally urged into position to prevent movement of the counter supporting block 7 to the right by a compression spring 30, as clearly shown in Fig. 1, the spring 30 engaging an extending portion 31 of the latch 25 and also engaging in a depression 32 formed in the side wall of a latch support 33 in which the latch is slidable. Extending upwardly from the latch support 33 is a lever 34 for controlling the latch 25. The latch support 33, in which the latch is slidable, is mounted upon a base plate 39, which may be adjustably secured to the base 5, the base plate 39 being slotted, as shown at 35, to receive a threaded stud 36 extending upwardly from the base 5, and a ring nut 37 being provided for fixing the plate 39 in position with respect to the base 5.

Mounted at the right end of the base 5 is a guide supporting block 42 on which there is, in turn, mounted a tubular guide member 43. The guide tube 43 is fixed to the block 42 by means of clamps 44 and 45 and is adapted to receive an extending end of the wire 21 from which insulation has been unwrapped. Interposed between the upper surface of the guide tube 43 and the clamp 44 is an L-shaped guide member 46, which has rounded guide slots 47 and 48 formed in the ends of its horizontally and vertically extending legs, as most clearly shown in Fig. 1. These rounded guide slots 47 and 48 are adapted to receive the wrapping 22 of insulation and aid in guiding it as it is drawn from the wire 21.

Suitably mounted in the trackway 6 is a stop support 55, in which there is threaded a stop member 56, which may be locked in any desired position in the stop support by a lock nut 57 to stop the counter after it has travelled the desired amount along the trackway 6.

A better understanding of the invention will be had by reference to the following detailed description of the mode of operation thereof. When it is desired to count the number of turns or servings of material on a strand; for example, to count the number of wrappings of insulating material on a wire, a sample length of wire may be cut from the supply to be checked and the insulation 22 unwrapped from the wire 21 for a short distance so that a short length of the wire will extend into the guide tube 43. After the desired length of wire has been cut from the supply to be checked, one end of the wire should be bent over, as indicated at 60, so that when the wire is positioned in the clamp 20, there will be no chance of the wire rotating without rotating the shaft 13 on which the clamp 20 is mounted. After the wire has been bent over at one end, as indicated at 60, and a short length of insulation has been unwrapped from its opposite end, the bare end of the wire may be inserted in the guide tube 43 and the unwrapped insulation directed through the guide slots 47 and 48. After the wire has thus been positioned in the apparatus, the counter block may be moved into engagement with the stop latch 25 and the pointer 23 will then be at the zero position on the scale 24. If the pointer 23 did not register exactly at the zero point on the scale 24, the position of the stop latch may be adjusted so that when the counter block 7 is in engagement with the latch 25, the pointer 23 will register at exactly zero on the scale 24. Before these preparations have been made, the stop member 56 may be adjusted to stop the pointer 23 at any place along the scale 24, dependent upon the length of the sample to be measured. The operator using the apparatus may now note the number which appears at the window 14 of the counter mechanism and may then draw the wrapping 22 of insulation in the direction indicated by the arrow 62 in Fig. 2. As the insulation 22 unwraps from the wire 21, the wire will be rotated, its right end bearing in the guide tube 43 and its left end being engaged in the clamp 20, will cause the shaft 13 to rotate and the counter block 7 and the counter 8 will travel along the trackway 6 until the counter block strikes the stop member 56. At this point, the pointer 23 will indicate the distance which the counter has travelled, which is the same as the length of the wire from which the insulation has been stripped, and the difference between the number originally appearing at the window 14 and the number now appearing at the window 14 will indicate the number of turns and tenths of turns of wrapping 22 which have been unwound from the wire 21. If, for any reason, the wrapping 22 on the wire 21 has become snarled or otherwise damaged so that it does not readily unwrap from the wire, the thumb nut 16 may be spun down to lock the counter temporarily until the snarling is disentangled and the unwrapping of the wrapping 22 may then be continued.

Although a specific embodiment of the invention has been described hereinbefore, it will be understood that it is to be limited only by the scope of the appended claims.

What is claimed is:

1. In an apparatus for determining the number of wrappings of a serving on a given length of core which comprises means for supporting an end of a core from which servings have been unwrapped, a counter shaft for supporting the wrapped end of the core, a bodily movable counting mechanism driven by said shaft upon rotation of the core by unwrapping the serving therefrom, means for guiding the counter, and a scale adjacent the guiding means for indicating the amount of movement of the counting mechanism.

2. In an apparatus for determining the number of wrappings of a serving on a given length of core which comprises means for supporting an end of a core from which servings have been unwrapped, a counter shaft for supporting the wrapped end of the core, a bodily movable counting mechanism driven by said shaft upon rotation of the core by unwrapping the serving therefrom, means for guiding the counter, and a scale adjacent the guiding means for indicating the amount of movement of the counting mechanism, said means for supporting the end of the core from which the serving has been unwrapped comprising a tubular member for receiving the bared core.

3. In an apparatus for determining the number of wrappings of a serving on a given length of core which comprises means for supporting an end of a core from which servings have been unwrapped, a counter shaft for supporting the wrapped end of the core, a bodily movable counting mechanism driven by said shaft upon rotation of the core by unwrapping the serving therefrom, means for guiding the counter, a scale adjacent the guiding means for indicating the amount of movement of the counting mechanism, and guiding means for guiding the serving as it is unwrapped from the core.

4. A wrap measuring apparatus comprising a core guiding means for receiving the bare end of a core, serving guiding means positioned on said core guiding means, a bodily movable counter movable toward the core guiding means as the serving is unwrapped from the core, a driving shaft for said counter, and means on said shaft for gripping the wrapped end of the core.

5. A wrap measuring apparatus comprising a core guiding means for receiving the bare end of a core, serving guiding means positioned on said core guiding means, a bodily movable counter movable toward the core guiding means as the serving is unwrapped from the core, a driving shaft for said counter, means on said shaft for gripping the wrapped end of the core, and a track for guiding said counter in its bodily movement.

6. A wrap measuring apparatus comprising a core guiding means for receiving the bare end of a core, serving guiding means positioned on said core guiding means, a bodily movable counter movable toward the core guiding means as the serving is unwrapped from the core, a driving shaft for said counter, means on said shaft for gripping the wrapped end of the core, a track for guiding said counter in its bodily movement, a scale positioned adjacent said track, and a pointer on the counter for cooperation with the scale to indicate the amount of bodily movement of the counter.

7. A wrap measuring apparatus comprising a core guiding means for receiving the bare end of a core, serving guiding means positioned on said core guiding means, a bodily movable counter movable toward the core guiding means as the serving is unwrapped from the core, a driving shaft for said counter, means on said shaft for gripping the wrapped end of the core, a track for guiding said counter in its bodily movement, a scale positioned adjacent said track, a pointer on the counter for cooperation with the scale to indicate the amount of bodily movement of the counter, and a spring pressed stop latch for normally holding the pointer at the zero position of the scale.

8. A wrap measuring apparatus comprising a core guiding means for receiving the bare end of a core, serving guiding means positioned on said core guiding means, a bodily movable counter movable toward the core guiding means as the serving is unwrapped from the core, a driving shaft for said counter, means on said shaft for gripping the wrapped end of the core, a track for guiding said counter in its bodily movement, a scale positioned adjacent said track, a pointer on the counter for cooperation with the scale to indicate the amount of bodily movement of the counter, and a stop member movable relative to the scale and adjustable to position the pointer on the counter at a predetermined position on the scale.

9. A wrap measuring apparatus comprising a core guiding means for receiving the bare end of a core, serving guiding means positioned on said core guiding means, a bodily movable counter movable toward the core guiding means as the serving is unwrapped from the core, a driving shaft for said counter, means on said shaft for gripping the wrapped end of the core, a track for guiding said counter in its bodily movement, a scale positioned adjacent said track, a pointer on the counter for cooperation with the scale to indicate the amount of bodily movement of the counter, a spring pressed stop latch for normally holding the pointer at the zero position of the scale, and means for moving said latch out of the path of the counter to permit movement of the counter by the serving being unwrapped from the core.

10. A wrap measuring apparatus comprising a core guiding means for receiving the bare end of a core, serving guiding means positioned on said core guiding means, a bodily movable counter movable toward the core guiding means as the serving is unwrapped from the core, a driving shaft for said counter, means on said shaft for gripping the wrapped end of the core, a track for guiding said counter in its bodily movement, a scale positioned adjacent said track, a pointer on the counter for cooperation with the scale to indicate the amount of bodily movement of the counter, a spring pressed stop latch for normally holding the pointer at the zero position of the scale, means for moving said latch out of the path of the counter to permit movement of the counter by the serving being unwrapped from the core, and an adjustable stop member for limiting the amount of movement of the counter with respect to the scale.

11. A wrap measuring apparatus comprising a core guiding means for receiving the bare end of a core, serving guiding means positioned on said core guiding means, a bodily movable counter movable toward the core guiding means as the serving is unwrapped from the core, a driving shaft for said counter, means on said shaft for gripping the wrapped end of the core, a track for guiding said counter in its bodily movement, a scale positioned adjacent said track, a pointer on the counter for cooperation with the scale to indicate the amount of bodily movement of the counter, and an adjustable stop member for limiting the amount of movement of the counter along the scale.

12. A wrap measuring apparatus comprising a core guiding tube for receiving a core from which material is being unwrapped, a counter slidable with respect to said tube, an actuator for said counter, said actuator being provided with a clamp to engage the wrapped end of the core to impart rotation to the actuator as the core rotates, and a scale associated with the counter to indicate the distance it moves.

13. A wrap measuring apparatus comprising a slidable counter mechanism, a trackway for guiding the counter during its sliding movement, a scale associated with the counter, a pointer associated with the scale and mounted on the counter to indicate the amount the counter has moved, an actuator for the counter having a clamp for engaging an end of a sample from which a wrapping is to be unwrapped, and a guide for the core of the sample.

PAUL J. DYE.